United States Patent [19]
Justo

[11] Patent Number: 6,079,405
[45] Date of Patent: Jun. 27, 2000

[54] CONTAINER WITH IN SITU DUAL FOOD PRODUCT MIXING AND HEATING

[76] Inventor: Jose A. Justo, 27 Read St., Newark, N.J. 07105

[21] Appl. No.: 09/452,070

[22] Filed: Nov. 30, 1999

[51] Int. Cl.[7] ........................................................ F24J 1/00
[52] U.S. Cl. ................................ 126/263.08; 126/263.09; 62/4
[58] Field of Search ......................... 126/263.08, 263.09; 62/4

[56] References Cited

U.S. PATENT DOCUMENTS

| | | | |
|---|---|---|---|
| 4,528,218 | 7/1985 | Maione | 62/4 |
| 5,461,867 | 10/1995 | Scudder et al. | 62/4 |

Primary Examiner—Carroll Dority
Attorney, Agent, or Firm—Mueller and Smith, LPA

[57] ABSTRACT

A container for housing and producing a liquid comestible product and in situ heating thereof has an upper comestible chamber and a lower comestible chamber separated by a comestible diaphragm. One of the comestible chambers retains a dry powder and the other comestible chamber retains water. A moveable pierce rod assembly penetrates from outside the container to inside the upper comestible chamber and is attached to an arm disposed outside of the container. A removable protective collar is disposed between the arm and the container to retain the arm and pierce rod assembly in place. A flexible collar is disposed within the protective collar to seal the pierce rod assembly between the arm and the container. The lower chamber houses an upper heating/cooling chamber and a lower heating heating/cooling chamber separated by a heating heating/cooling diaphragm. One of the heating heating/cooling chambers retains a chemical reactant and the other heating heating/cooling chamber retains water. A moveable plunger is retained by a flexible plunger diaphragm and is hand actuated from outside the container. The plunger is disposed to penetrate through and rupture the heating heating/cooling diaphragm when actuated from outside the container to combine the chemical reactant and water for generating/withdrawing heat to heat/cool the contents of the lower chamber. A dispensing tube is provided for removing the liquid comestible product from the container. Removal of the protective collar permits the pierce rod to be actuated from outside of the container for releasing contents in the upper comestible chamber into contents in the lower comestible chamber for producing a liquid comestible product from the powder and the water. The liquid comestible product can be heated/cooled by actuating the plunger to rupture the heating diaphragm.

18 Claims, 3 Drawing Sheets

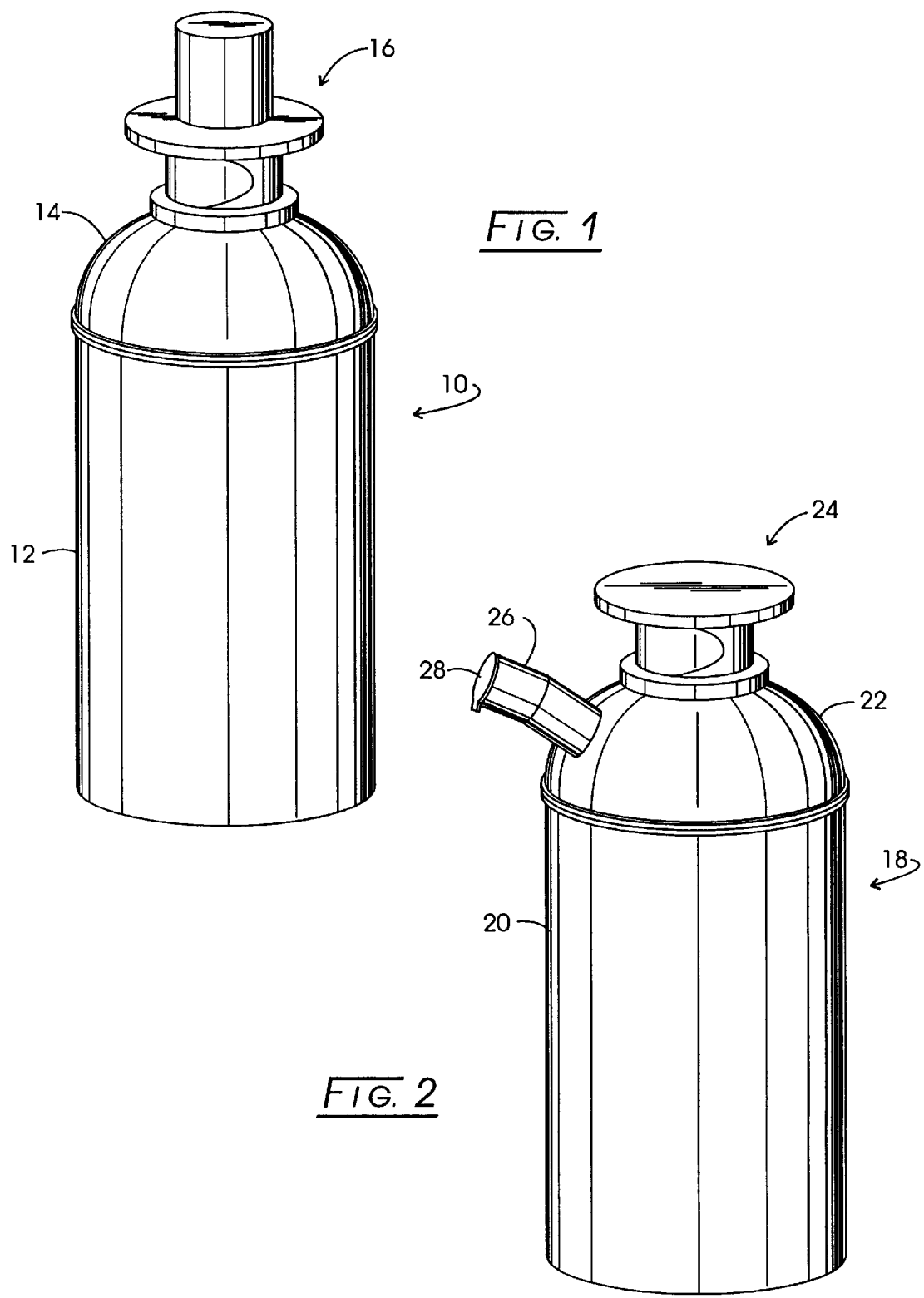

CONTAINER WITH IN SITU DUAL FOOD PRODUCT MIXING AND HEATING

CROSS-REFERENCE TO RELATED APPLICATIONS

None.

STATEMENT REGARDING FEDERALLY SPONSORED RESEARCH

Not applicable.

BACKGROUND OF THE INVENTION

The present invention generally relates to packaging containers for a variety of, inter alia, beverages and other liquid comestibles, and more particularly to packaging containers that permit such liquid comestibles to be made from dry mixes and water in the field along with heating of the thus-formed liquid comestibles.

A variety of liquid comestibles have limited shelf life and/or require refrigeration. Consumers of such products, however, often are required to consume such liquid comestibles when they are not at home and/or do not have access to refrigeration facilities. For example, a variety of foodstuffs will spoil if they are not refrigerated. The same is true for a variety of pharmaceutical products. Risk of spoilage due to bacterial contamination translates into a limited useful life of the product absent refrigeration. In other contexts, liquid comestible products may require heating for sterilization, organoleptic properties, etc. Thus, not only does the consumer require that the liquid comestible be refrigerated prior to ingestion, but often the comestible must be heated prior too.

The art has addressed the foregoing dilemma and proposed a variety of packing containers. For example, U.S. Pat. No. 5,388,565 proposes a self-heating container system for heating beverages or food, wherein the container has an upper chamber filled with water separated by a thin plate from a lower chamber filled with lime. Sharp spikes can be depressed from outside the container to pierce the thin plate.

U.S. Pat. No. 4,528,218 proposes a similar heating system for heating or cooling foodstuffs wherein an external lockout system prevents unintended piercing of the diaphragm and premature heating/cooling of the foodstuff.

U.S. Pat. No. 3,596,801 proposes a liquid/powder foodstuff mixing container with a piercing tool actuated from outside the container to pierce a diaphragm separating the water and powder. No heating or cooling is shown.

U.S. Pat. No. 5,514,394 proposes a similar mixing container for dry cereal and milk.

U.S. Pat. No. 5,461,867 proposes a self-heating container system for heating beverages or food much like that system in the '565 patent.

U.S. Pat. Nos. 4,753,085 and 5,205,277 propose other self-heating container system variants to the '565 and the '867 patents.

Despite these proposals, there still is a need in the art for a simple, yet reliable container that can house separately liquid and powder for admixing in the field, followed by heating of the in situ formed liquid comestible in the same container. The present invention is addressed to such need.

BRIEF SUMMARY OF THE INVENTION

A container for housing and producing a liquid comestible product and in situ heating thereof has an upper comestible chamber and a lower comestible chamber separated by a comestible diaphragm. One of the comestible chambers retains a dry powder and the other comestible chamber retains water. A moveable pierce rod assembly penetrates from outside the container to inside the upper comestible chamber and is attached to an arm disposed outside of the container. A removable protective collar is disposed between the arm and the container to retain the arm and pierce rod assembly in place. A flexible collar is disposed within the protective collar to seal the pierce rod assembly between the arm and the container. The lower chamber houses an upper heating (or cooling) chamber and a lower heating (or cooling) chamber separated by a heating diaphragm. One of the heating (or cooling) chambers retains a chemical reactant and the other heating (or cooling) chamber retains water. A moveable plunger is retained by a flexible plunger diaphragm and is hand actuated from outside the container. The plunger is disposed to penetrate through and rupture the heating (or cooling) diaphragm when actuated from outside the container to combine the chemical reactant and water for generating heat (or removing heat) to heat (or cool) the contents of the lower chamber. A dispensing tube is provided for removing the liquid comestible product from the container. Removal of the protective collar permits the pierce rod to be actuated from outside of the container for releasing contents in the upper comestible chamber into contents in the lower comestible chamber for producing a liquid comestible product from the powder and the water. The liquid comestible product can be heated (or cooled) by actuating the plunger to rupture the heating (or cooling) diaphragm. The liquid comestible product can be heated (or cooled) by actuating the plunger to rupture the heating (or cooling) diaphragm. The mixture will produce a desired liquid comestible product at a desired temperature (e.g., coffee, tea, cocoa, broth, juice, infant formula, etc.). In this application the alternative of heating or cooling often will be represented as follows: heating/cooling.

Advantages of the present invention include the ability to carry the container to remote locations devoid of refrigeration. Another advantage is the ability to mix the dry powder and water via hand activation to form a liquid comestible product. A further advantage is the ability to hand activate a heating system also housed with the container for heating the liquid comestible product. A yet further advantage is the ability to enhance the ability of the water to dissolve the dry powder by the heating of the water. A yet another advantage is the ability to adapt the container to have a baby bottle configuration for feeding infants formula. Still a further advantage is the ability to adapt the container to be used by children and adults. Still another advantage is the ability to prepare both liquid nutritional products as well as liquid medicinal comestible products. These and other advantages will be readily apparent to those skilled in the art based on the disclosure set forth herein.

BRIEF DESCRIPTION OF THE DRAWINGS

For a fuller understanding of the nature and objects of the present invention, reference should be had to the following detailed description taken in connection with the accompanying drawings in which:

FIG. 1 is a perspective view of the container in a baby bottle configuration;

FIG. 2 is a perspective view of the container in drinking container configuration;

Figure 3:
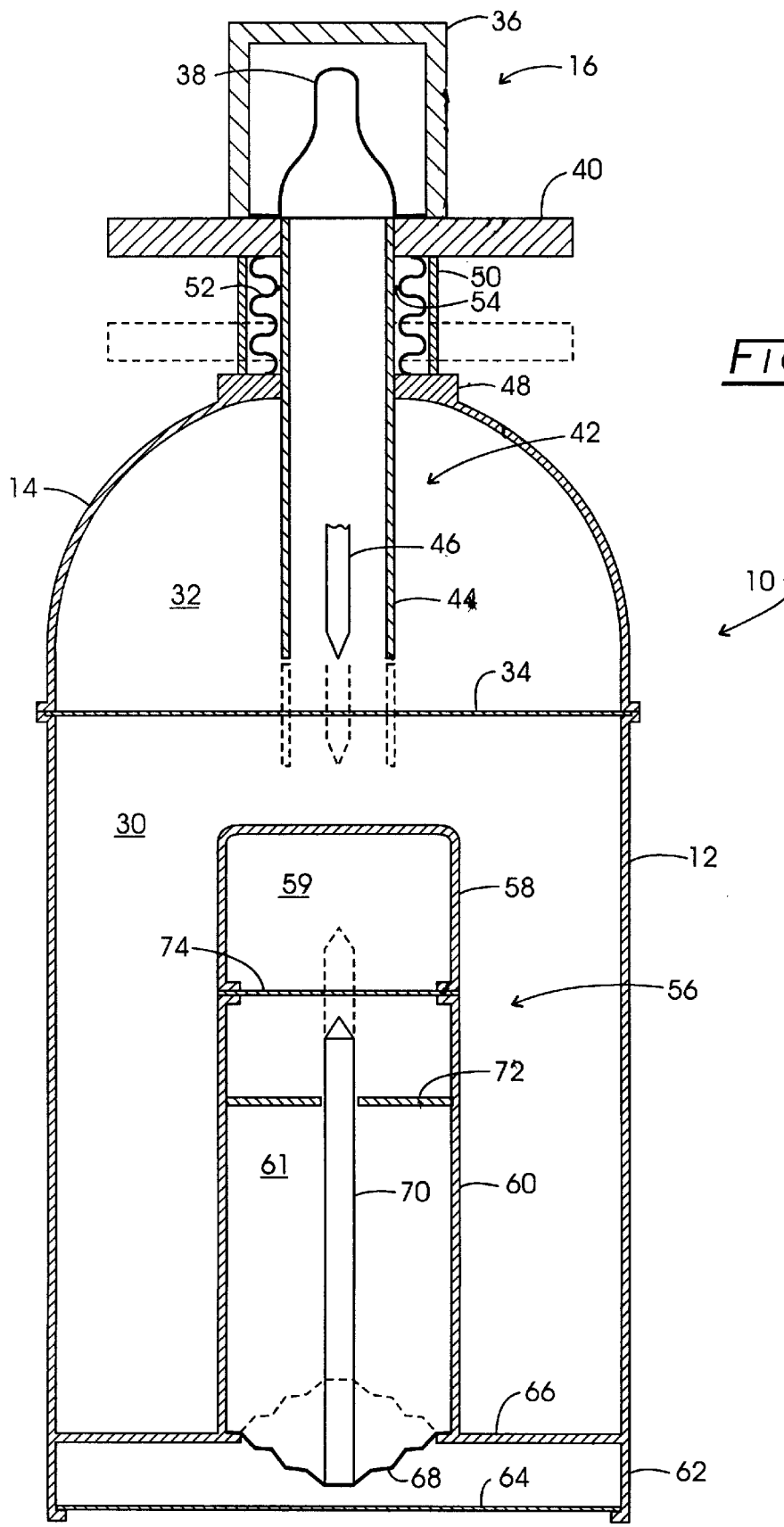
FIG. 3 is a cross-sectional elevational view of the container of FIG. 1.

The drawings will be described in detail below.

DETAILED DESCRIPTION OF THE INVENTION

Referring initially to FIG. 1, container 10 is seen to be composed of generally cylindrical lower section 12 with generally hemispherical upper section 14. Surmounting section 14 is assembly 16 which both actuates the mixing the dry powder and water for forming the liquid comestible product (i.e., baby formula) and carries a nipple for an infant to drink the formula.

Referring to FIG. 2, container 18 is seen to be composed of generally cylindrical lower section 20 with generally hemispherical upper section 22. Surmounting section 22 is actuator assembly 24 which actuates the mixing the dry powder and water for forming the liquid comestible product (i.e., tea, broth, coffee, cocoa, etc.). Section 22 also carries tube or spout 26 whose end is sealed by seal 28. Children and adults can drink the comestible liquid in container 18 through spout 26. Containers 10 and 18 can vary in size, for example, from the size of an 8 ounce baby bottle to the size of a thermos. The size is a matter of design choice for the particular type of comestible liquid of interest, the number of servings desired, and like factors known to those skilled in the art.

Referring to FIG. 3, it will be observed that lower cylindrical section 12 is annular and forms lower comestible chamber 30. Upper generally hemispherical section 14 also is hollow and forms upper comestible chamber 32. Separating chambers 30 and 32 is diaphragm 34 which can be formed from a thin sheet of plastic, metal, or the like. Assembly 16 serves both to actuate the mixing of the dry powder and water for forming the liquid comestible product (i.e., baby formula) and carries a nipple for an infant to drink the formula. To this end, assembly 16 includes removable outer cap 36 which serves to protect nipple 38 housed therein. Cap 36 fits down against arm 40. Arm 40 in turn carries moveable pierce rod assembly 42 which penetrates downwardly into upper comestible chamber 32 and is seen to include annular pierce member 44 and interiorly disposed pierce rod 46. Pierce rod assembly 42 is kept in alignment by guide 48 which may be formed integrally with upper section 14.

Removable protective collar 50 fits between arm 40 and guide 48 and protects flexible collar 52 that fits annularly therein side. Stop 54 is connected to annular piece member 44. In use, collar 50 is removed by the user who then pushes downwardly on arm 40 to cause pierce rod assembly 42 to penetrate through and puncture diaphragm 34 until stop 54 reaches guide 48. Removal of cap 36 permits nipple 38 to be exposed for use. The flexibility of collar 52 permits arm 40 to be moved while still sealing the upper section of pierce rod assembly 42 from the outside.

Disposed within lower comestible chamber 30 is heating assembly 56 which is composed of upper heating section 58 and lower heating section 60 which define, respectively, upper heating chamber 59 and lower heating chamber 61. The lower portion of cylindrical lower section 12 terminates with annulus 62 which is covered with removable bottom protective cover 64 which precludes access to heating assembly 56 until cover 64 is removed by the user. The bottom of cylindrical lower section 12 is fitted with annular bottom 66. The hole in annular bottom 66 is covered with flexible diaphragm 68 which is connected to moveable plunger 70 which fits into plunger guide 72 disposed within lower heating chamber 61. Heating chamber diaphragm 74 separates upper heating chamber 59 from lower heating chamber 61. In use, the user would remove cover 64 to expose flexible diaphragm 68 which the user would push so as to cause plunger 70 to rupture diaphragm 74.

Now that the structure and function of container 10 has been described, an exemplary use will be described with specific reference to dispensing heated baby formula. Chamber 32 will be filled with dry baby formula powder while chamber 30 will have water. Chamber 59 will contain a dry chemical while chamber 61 will contain water. In use, the user will first initiate the chemical reaction between the chemical powder in chamber 59 with the water in chamber 61. This will start the heating of the water in chamber 30. Thereafter, the user will puncture diaphragm 34 to mix the baby formula powder with the heating water. After a few minutes, chamber 30 will contain the heated liquid baby formula which can be fed to an infant via nipple 38. Of course chambers 30 and 32 will be aseptically filled.

As to the chemical reactant in chamber 59, a variety of chemical reactants are well known in the art. These include, for example, alkaline earth oxide (e.g., CaO), glacial acetic acid, sulfuric acid, and the like. Such chemical reactants generate heat when combined with water (exothermic reaction). It will be appreciated that other chemical reactants could be used that result in an endothermic reaction when mixed with water for the cooling of the contents in chamber 30. These reactants include, for example, ammonium nitrate, ammonium chloride, and the like.

Of course, materials of construction will be suitable for the types of comestible products being stored and heated (cooled) and will be able to withstand the temperatures generated in chamber 61, for example. Thus, temperature resistant plastics will be favored for their cost, disposability, and ability to withstand the expected temperatures to be encountered. Such plastics will include, for example, suitable acrylic polymers, polyolefin polymers, polyethylene terephthalate, and the like.

Figure 4:
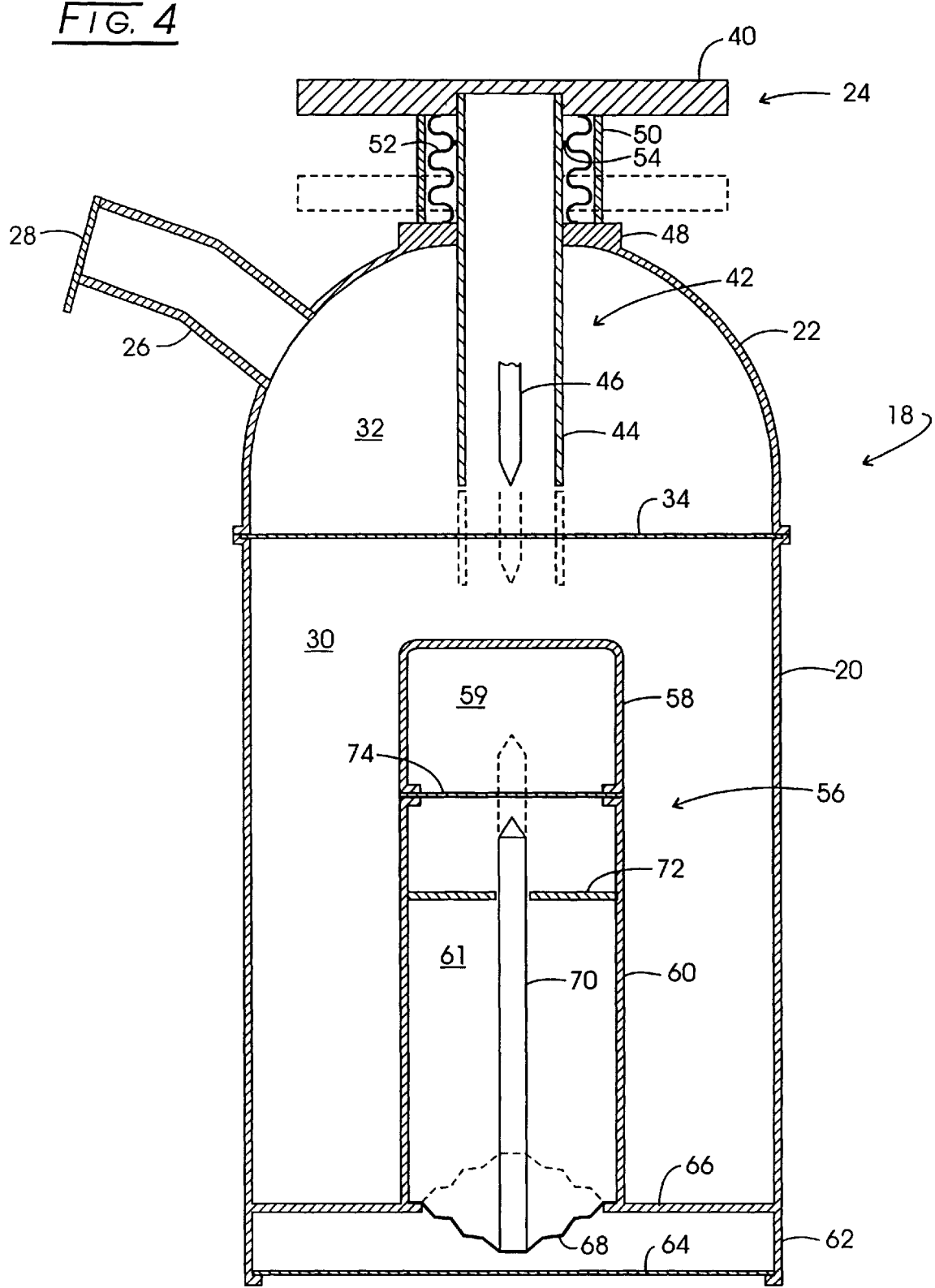
FIG. 4 is a cross-sectional elevational view of the container of FIG. 2.

As an alternative to a baby bottle container, FIG. 4 details the construction of container 18 in FIG. 2. Heating assembly 56 is the same as in FIG. 3 as is its operation. Moveable pierce rod assembly 42 also is the same. Actuator assembly 24 functions as described in connection with FIG. 3, except that nipple 38 and cap 36 have been replaced with spout 26 whose end is sealed by seal 28. Thus, an adult or child can drink from container 18 via spout 26. Suitable comestible products include, inter alia, coco, broth, tea, coffee, and the like. Here, heating as well as cooling of the comestible product may be desirable and is accomplished as described above.

While the foregoing description has concentrated on nutritional comestible products, it will be appreciated that certain medicinal products (e.g., antibiotics) may come in powder form for admixing with water to product an oral or ingestive medicine for consumption by, for example, toddlers, children, and adults. Heating of such medicinal products could aid in their dissolution by heated water, aid in their efficacy, etc. the same can be said for cooling of the medicinal products which may make them more organoleptically palatable. Thus, the inventive container could be used to provide a variety of ingestive products, either heated or cooled.

What is claimed is:

1. A container for housing and producing a liquid comestible product and in situ heating thereof, which comprises:

(a) a container having an upper comestible chamber and a lower comestible chamber separated by a comestible diaphragm, one of said chambers retaining a dry powder and the other comestible chamber retaining water;

(b) a moveable pierce rod assembly penetrating from outside said container to inside said upper comestible chamber and being attached to an arm disposed outside of said container;

(c) a removable protective collar being disposed between said arm and said container to retain said arm and pierce rod assembly in place;

(d) a flexible collar being disposed within said protective collar to seal said pierce rod assembly between said arm and said container;

(e) said lower chamber housing an upper heating chamber and a lower heating chamber separated by a heating diaphragm, one of said heating chambers retaining a chemical reactant and the other heating chamber retaining water;

(f) a moveable plunger retained by a flexible plunger diaphragm and hand actuated from outside said container, said plunger disposed to penetrate through and rupture said heating diaphragm when actuated from outside said container to combine said chemical reactant and water for generating heat to heat the contents of said lower chamber; and (g) a dispensing tube for removing said liquid comestible product from said container;

whereby, removing said protective collar permits said pierce rod to be actuated from outside of said container for releasing contents in said upper comestible chamber into contents in said lower comestible chamber for producing a liquid comestible product from said powder and said water, which liquid comestible product can be heated by actuating said plunger to rupture said heating diaphragm.

2. The container of claim 1, wherein said dry powder is one or more of tea, broth, coffee, coco, juice, or baby formula.

3. The container of claim 1, wherein said dispensing tube is fitted with a nipple about which a removable cap is retained.

4. The container of claim 1, wherein chemical reactant is one or more of alkaline earth oxide, glacial acetic acid, or sulfuric acid.

5. The container of claim 1, which is manufactured from one or more of an acrylic polymer, a polyolefin polymer, or polyethylene terephthalate.

6. The container of claim 1, wherein said upper comestible chamber is fitted with a spout having a cap thereon.

7. A container for housing and producing a liquid comestible product and in situ heating thereof, which comprises:

(a) a container having an upper comestible chamber and a lower comestible chamber separated by a comestible diaphragm, one of said comestible chambers retaining a dry powder and the other comestible chamber retaining water;

(b) a moveable pierce rod assembly penetrating from outside said container to inside said upper comestible chamber and being attached to an arm disposed outside of said container;

(c) a removable protective collar being disposed between said arm and said container to retain said arm and pierce rod assembly in place;

(d) a flexible collar being disposed within said protective collar to seal said pierce rod assembly between said arm and said container;

(e) said lower chamber housing an upper cooling chamber and a lower cooling chamber separated by a cooling diaphragm, one of said cooling chambers retaining a chemical reactant and the other cooling chamber retaining water; (f) a moveable plunger retained by a flexible plunger diaphragm and hand actuated from outside said container, said plunger disposed to penetrate through and rupture said heating diaphragm when actuated from outside said container to combine said chemical reactant and water for removing heat to cool the contents of said lower chamber; and (g) a dispensing tube for removing said liquid comestible product from said container;

whereby, removing said protective collar permits said pierce rod to be actuated from outside of said container for releasing contents in said upper comestible chamber into contents in said lower comestible chamber for producing a liquid comestible product from said powder and said water, which liquid comestible product can be cooled by actuating said plunger to rupture said cooling diaphragm.

8. The container of claim 7, wherein said dry powder is one or more of tea, broth, coffee, coco, or juice.

9. The container of claim 7, wherein said dispensing tube is fitted with a nipple about which a removable cap is retained.

10. The container of claim 7, wherein chemical reactant is one or more of alkaline earth oxide, glacial acetic acid, or sulfuric acid.

11. The container of claim 7, which is manufactured from one or more of an acrylic polymer, a polyolefin polymer, or polyethylene terephthalate.

12. The container of claim 7, wherein said upper comestible chamber is fitted with a spout having a cap thereon.

13. A method for producing a heated or cooled liquid comestible product from said powder and said water which housed in a container, which comprises the following steps:

(I) providing a container that comprises:

(a) a container having an upper comestible chamber and a lower comestible chamber separated by a comestible diaphragm, one of said comestible chambers retaining a dry powder and the other comestible chamber retaining water;

(b) a moveable pierce rod assembly penetrating from outside said container to inside said upper comestible chamber and being attached to an arm disposed outside of said container;

(c) a removable protective collar being disposed between said arm and said container to retain said arm and pierce rod assembly in place;

(d) a flexible collar being disposed within said protective collar to seal said pierce rod assembly between said arm and said container;

(e) said lower chamber housing an upper heating/cooling chamber and a lower heating heating/cooling chamber separated by a heating heating/cooling diaphragm, one of said heating heating/cooling chambers retaining a chemical reactant and the other heating heating/cooling chamber retaining water;

(f) a moveable plunger retained by a flexible plunger diaphragm and hand actuated from outside said container, said plunger disposed to penetrate through and rupture said heating heating/cooling diaphragm when actuated from outside said container to combine said chemical reactant and water for generating/withdrawing heat to heat/cool the contents of said lower chamber; and (g) a dispensing tube for removing said liquid comestible product from said container;

(II) removing said protective collar;

(III) actuating said pierce rod from outside of said container for releasing contents in said upper comestible chamber into contents in said lower comestible chamber for producing a liquid comestible product from said powder and said water; and (IV) actuating said plunger to rupture said heating diaphragm for heating said liquid comestible product.

14. The method of claim 13, wherein said dry powder is one or more of tea, broth, coffee, coco, or juice.

15. The method of claim 13, wherein said dispensing tube is fitted with a nipple about which a removable cap is retained.

16. The method of claim 13, wherein chemical reactant is one or more of alkaline earth oxide, glacial acetic acid, or sulfuric acid.

17. The method of claim 13, which is manufactured from one or more of an acrylic polymer, a polyolefin polymer, or polyethylene terephthalate.

18. The method of claim 13, wherein said upper comestible chamber is fitted with a spout having a cap thereon.

* * * * *